United States Patent
Molander

(10) Patent No.: US 10,380,569 B2
(45) Date of Patent: Aug. 13, 2019

(54) SYSTEMS, METHODS, AND APPARATUSES FOR DISPLAYING PURCHASE TRANSACTION ELEMENTS BASED ON A DETERMINED HIERARCHY

(71) Applicant: Toshiba TEC Corporation, Tokyo (JP)

(72) Inventor: Mark Molander, Raleigh, NC (US)

(73) Assignee: Toshiba TEC Corporation, Tokyo (JP)

( * ) Notice: Subject to any disclaimer, the term of this patent is extended or adjusted under 35 U.S.C. 154(b) by 525 days.

(21) Appl. No.: 14/822,948

(22) Filed: Aug. 11, 2015

(65) Prior Publication Data
US 2017/0046675 A1    Feb. 16, 2017

(51) Int. Cl.
G06Q 20/20    (2012.01)
G06T 11/60    (2006.01)

(52) U.S. Cl.
CPC .............. *G06Q 20/20* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 5,125,465 A | 6/1992 | Schneider | |
| 5,426,282 A | 6/1995 | Humble | |
| 5,821,926 A | 10/1998 | Arita | |
| 6,363,366 B1 | 3/2002 | Henty | |
| 7,118,026 B2 | 10/2006 | Hunter et al. | |
| 7,168,525 B1 | 1/2007 | Jacobs | |
| 7,328,174 B2 | 2/2008 | Baratz | |
| 7,380,725 B2 | 6/2008 | McGill | |
| 7,603,621 B2 | 10/2009 | Toyama et al. | |
| 8,582,802 B2 | 11/2013 | Clippard et al. | |
| 8,840,013 B2 | 9/2014 | Roundtree et al. | |
| 9,665,900 B1* | 5/2017 | Claeson | G06Q 30/0631 |
| 2002/0004753 A1 | 1/2002 | Perkowski | |
| 2002/0042736 A1 | 4/2002 | Wang et al. | |
| 2003/0208399 A1* | 11/2003 | Basak | G06Q 30/02 705/14.53 |
| 2004/0021584 A1 | 2/2004 | Hartz et al. | |
| 2008/0186381 A1* | 8/2008 | Guo | G08B 13/19663 348/143 |
| 2010/0268661 A1* | 10/2010 | Levy | G06Q 30/02 705/347 |
| 2013/0080890 A1 | 3/2013 | Krishnamurthi | |
| 2013/0103509 A1 | 4/2013 | Hidehiro et al. | |

FOREIGN PATENT DOCUMENTS

JP    2012100068 A    5/2012

* cited by examiner

*Primary Examiner* — Paul Danneman
(74) *Attorney, Agent, or Firm* — Olive Law Group, PLLC

(57) ABSTRACT

Systems, methods, and apparatuses for displaying repeating purchase transaction elements based on a determined hierarchy are disclosed. According to an aspect, a method includes receiving display information for display of elements on a display. Each element being associated with a purchase transaction. The method also includes determining a hierarchy of one of the elements with respect to at least one of the other elements. Further, the method includes dynamically determining a display specification for the one of the elements based on the determined hierarchy. The method also includes displaying the one of the elements on the display in accordance with the determined display specification.

17 Claims, 4 Drawing Sheets

SYSTEMS, METHODS, AND APPARATUSES FOR DISPLAYING PURCHASE TRANSACTION ELEMENTS BASED ON A DETERMINED HIERARCHY

TECHNICAL FIELD

The present disclosure relates to conducting purchase transactions, and more specifically, to displaying repeating purchase transaction elements based on a determined hierarchy.

BACKGROUND

In retail environments, such as grocery stores and other "brick and mortar" stores, retail personnel use equipment, such as point-of-sale (POS) equipment for conducting purchase transactions with customers. POS equipment may include a user interface, such as a keyboard and display, with which retail personnel can enter data and view information related to a purchase transaction. In addition, POS equipment may include scanners for optically scanning bar codes affixed to items or products for purchase by a customer. The POS equipment may also include a customer-facing display and other user interface equipment with which the customer can interface for conducting the purchase transaction.

Selection of items to be purchased by a customer can be very time consuming for retail personnel. Especially in a grocery store setting, a customer may have many items for purchase, and this can take a considerable amount of time for entry when conducting a purchase transaction. Scanners are often used for quickly entering data for identifying an item. However, not all items have barcodes that can be scanned. For example, entry of produce, such as fruits and vegetables, can be time consuming, because the product look-up (PLU) code for a particular item may not be familiar to the retail personnel entering the item. Also, in self-checkout, a customer may not know the code and may be frustrated when trying to enter it. For at least these reasons, it is desired to provide an improved technique for guiding and selecting items for a purchase transaction.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
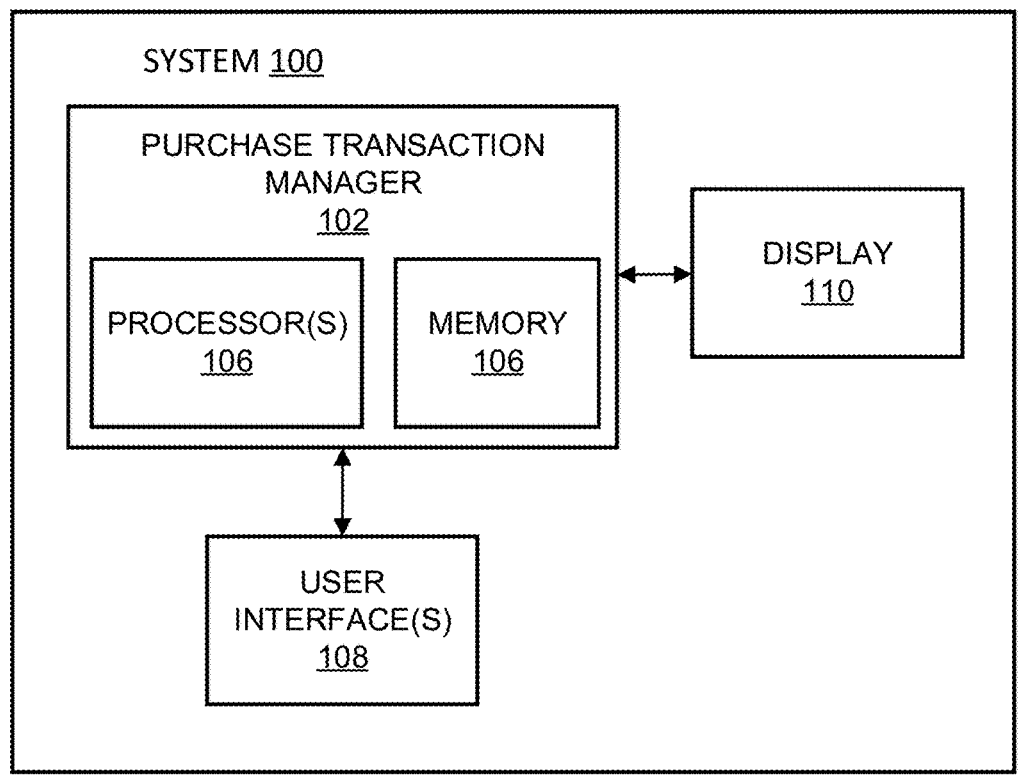
FIG. 1 is a block diagram of an example system for displaying purchase transaction elements based on a determined hierarchy in accordance with embodiments of the present disclosure.

The present disclosure is now described in more detail. For example, FIG. 1 illustrates a block diagram of an example system 100 for displaying purchase transaction elements based on a determined hierarchy in accordance with embodiments of the present disclosure. Referring to FIG. 1, the system 100 may be POS equipment, such as a checkout terminal, situated within a retail store for conducting purchase transactions. The system 100 may be operated by retail personnel, such as a checkout clerk, and positioned in a checkout portion of the retail store as will be understood. Customers may also interact with the system 100 and the retail personnel to conduct a purchase transaction for items gathered in the store. In another example, the system 100 may be a self-checkout POS with which a customer may interact for conducting a purchase transaction as will be understood. The system 100 may be one of several such systems connected via one or more networks to a server. The server may provide retail management functions to the systems. Further, for example, the system 100 may be configured to communicate to the server purchase transaction information or other data for implementing retail functions. The system 100 may be configured to receive communications from the server related to retail functions. The system 100 may include suitable network interface equipment for communicating with the server via the network.

The shopper terminal 100 may include a purchase transaction manager 102 that is configured to implement purchase transactions. The purchase transaction manager 102 may be implemented by hardware, software, firmware, or combinations thereof For example, the purchase transaction manager 102 may be implemented by one or more processors 104 and memory 106. The purchase transaction manager 102 may be configured to implement a point-of-sale (POS) application. The shopper terminal 100 may include one or more user interfaces 108 for interfacing with retail personnel and/or a customer. For example, the user interface 106 may include a display, a keyboard, or the like. The system 100 may communicate over one or more networks with network entities, such as financial institutions. Purchases may be made via the system 100 whereby the system 100 facilitates electronic funds transfers over network(s) between customer accounts for one or more financial institutions and an establishment that implements the system 100 (i.e., a vendor). The system 100 may also include a display 110 (e.g., a touchscreen display) that faces retail personnel and/or a customer during operation.

Figure 2:
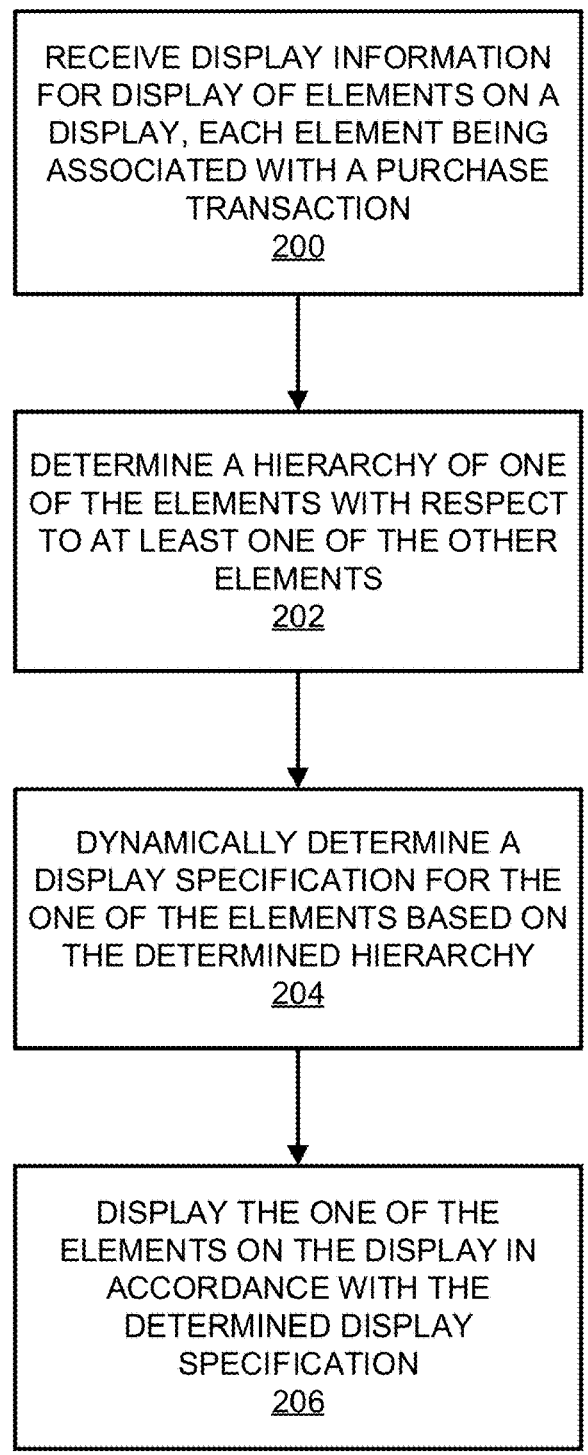
FIG. 2 is a flow chart of an example method for displaying purchase transaction elements based on a determined hierarchy in accordance with embodiments of the present disclosure.

FIG. 2 illustrates a flow chart of an example method for displaying purchase transaction elements based on a determined hierarchy in accordance with embodiments of the present disclosure. In this example, the method is described as being implemented by the purchase transaction manager 102 of system 100 shown in FIG. 1, although it should be recognized that the method may be implemented by any suitable computing device.

Referring to FIG. 2, the method includes receiving 200 display information for display of elements on a display, each element being associated with a purchase transaction. For example, the purchase transaction manager 102 of the system 100 shown in FIG. 1 may receive display information for displaying elements on a display. For example, an element can be an image, text, or any other suitable representation of an item for sale. As an example, the display information for an item may include image data, a PLU (or the like), name, type, and/or any other information associated with an item for sale in a store. In this example, the display information includes image data, PLUs, names, and types of vegetables and fruit for sale in a grocery store, although it should be understood that the display information may alternatively be any other display information associated with items for sale. The display information may be in a suitable format and include instructions for display of representations of the items.

The method of FIG. 2 includes determining 202 a hierarchy of one of the elements with respect to at least one of the other elements. Continuing the aforementioned example, the purchase transaction manager 102 may determine a hierarchy of one or more items for sale with respect to each other. For example, the purchase transaction manager 102 may determine that a particular type of vegetable is more likely to be purchased by a customer than one or more other types of vegetables. In this instance, the vegetable determined to be more likely purchased is deemed to be higher in the hierarchy among the other vegetables. Further in this example, an element for display associated with the vegetable determined to be more likely purchased is set by the purchase transaction manager 102 to be higher in a hierarchy than elements of other vegetables.

A determination of the likelihood of purchase of an item may be based upon a purchase history of the items within the store and/or other stores. For example, store records may indicate that it is expected that customers will buy a common green asparagus 80% of the time, and that four (4) other types of vegetables together will be bought 20% of the time. In this example and based on this purchase history, purchase transaction manager 102 may place the common green asparagus and its display element higher in the hierarchy. For example, the purchase transaction manager 102 may compare a likelihood of purchase of an item for sale associated with an element against a likelihood of purchase of one or more other elements. Subsequently, the purchase transaction manager 102 may place the element in the hierarchy with respect to the other elements based on the comparison.

In another example, placement in the hierarchy may be determined based on a sales status or discounts of items. For example, the purchase transaction manager 102 may determine that one particular type of vegetable is on sale. In response to this determination, the purchase transaction manager 102 may place that type of vegetable higher in the hierarchy than other vegetables. In this way, the purchase transaction manager 102 can order the elements in the hierarchy based on a sales status or discounts of the elements.

In yet another example, placement in the hierarchy may be determined based on customer purchase history. For example, during a purchase transaction, identifying information for a customer may be received by the purchase transaction manager 102. For example, the customer may interface with the user interface 108 to enter identifying customer identification information, such as by scanning a customer loyalty card. In another example, the customer may be identified by use of an in-store camera, such as a camera installed in POS equipment or elsewhere. The purchase transaction manager 102 may subsequently access a database either remotely or locally to obtain purchase history information for the customer. Based on the purchase history information, the purchase transaction manager 102 may determine that one or more items have been previously purchased by the customer or that one or more items are frequently purchased by the customer. In this instance, the purchase transaction manager 102 can place the item(s) higher in the hierarchy than other items. Example customer purchase history information includes, but is not limited to, his or her previous buying habits, items for purchase, demographics, and the like.

In yet another example, placement in the hierarchy may be determined based on items being purchased by a customer. For example, one or more items may be determined to be in the customer's cart. For example, an item may be scanned for purchase by the customer. Based on identification of the item to be purchased, the purchase transaction manager 102 may determine that one or more other items are likely to be purchased. For example, if hot dogs are scanned in a purchase transaction with a customer, the purchase transaction manager 102 may determine that it is likely that hot dog buns will also be purchased. In this instance, the purchase transaction manager 102 can place hot dog buns higher in the hierarchy than other items.

In yet another example, placement in the hierarchy may be determined based on a season, a time of day, day, the like, or combinations thereof when items associated with the elements are being purchased. For example, the purchase transaction manager 102 may determine that an item is more likely to be purchased during a particular time (e.g., season, time of day, or day). In an example, particular types of fruits (e.g., watermelon) may be more likely to be purchased in summer. In this instance, the purchase transaction manager 102 can place those particular types of fruits higher in the hierarchy than other items at those times.

In an alternative example, a computing device other than the system 100 may determine the hierarchy of elements. For example, a server communicatively connected to the system 100 may determine the hierarchy and communicate the hierarchy information to the system 100 shown in FIG. 1. The server may distribute this information to all systems within a retail environment.

Referring again to FIG. 2, the method includes dynamically determining 204 a display specification for the element based on the determined hierarchy. Continuing the aforementioned example, the purchase transaction manager 102 may determine a display specification for one or more elements based on the determined hierarchy. For example, a purchase transaction manager 102 may receive input from retail personnel or a customer for displaying a menu of various items for purchase. The displayed menu may include, for example, representations of vegetables and fruits for purchase. The display specification may indicate a size, display location, and/or the like for representing a corresponding item for sale on the display. Items may initially be associated with data indicating a default display specification. For example, an item may be represented by its name, an image, and a PLU positioned within a 1 inch×1 inch square area displayed on the display. In accordance with embodiments of the present disclosure, the purchase transaction manager 102 may dynamically change a display specification from the default display specification based on a determined position of the item in the hierarchy. In the case of the item being higher in the hierarchy, the representation of the item may be displayed in a square area that is larger than the default 1 inch×1 inch square area. For example, the specification for the item may be dynamically altered such that its representation is displayed in a 2 inch×2 inch square area on the display. The display specification of items may be dynamically determined during the purchase transaction.

The method of FIG. 2 includes displaying 206 the one of the elements on the display in accordance with the determined display specification. Continuing the aforementioned example, the purchase transaction manager 102 may control the display to display the element on the display 110 in accordance with the determined display specification. For example, the element may be associated with an item for purchase that is higher than others. In this instance, the element or representation of the item may be displayed larger than the default and/or in a more prominent position on the display 110 than other items. In the instance that the element is not higher than others in the hierarchy, the element may be displayed in accordance with the default specification or obscured from view in comparison to other items.

Figure 3:
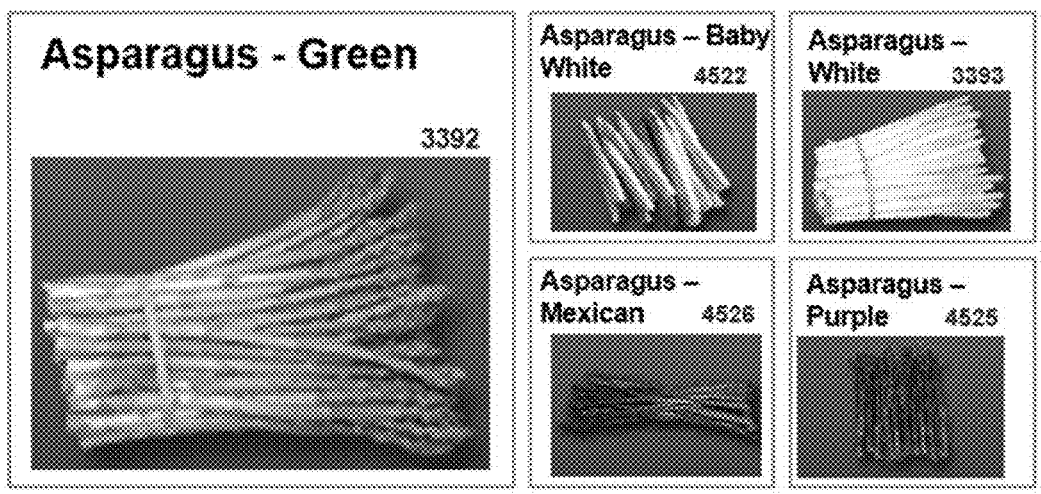
FIG. 3 is a screen display portion showing the display of multiple elements in accordance with embodiments of the present disclosure.

FIG. 3 illustrates a screen display portion showing the display multiple elements in accordance with embodiments of the present disclosure. Referring to FIG. 3, the screen display portion may be a portion of what is displayed on the example display 110 shown in FIG. 1. The screen display portion includes five (5) elements associated with 5 different types of asparagus that are available for purchase in an example grocery store. Each element is associated with a PLU, image, and name for the associated asparagus type. An operator of the system 100 may suitably select one or more of the displayed elements for use in conducting a purchase transaction. For example, the operator may select asparagus—green (corresponding to PLU 3392) for entering that item for purchase. Selection may be implemented by touching the area corresponding to the element on the display screen, or entering the PLU number via a suitable user interface. In this example, the element corresponding to "Asparagus—Green" is larger than the other elements. In this case, the "Asparagus—Green" element or the item is considered higher in the hierarchy than the other elements. In this example, the larger element corresponds to a vegetable that is move likely purchased than the other vegetables. Thus, the element is larger and more prominent, so that an operator will be more guided and less likely to make a mistake when making selection of the vegetable.

Figure 4:
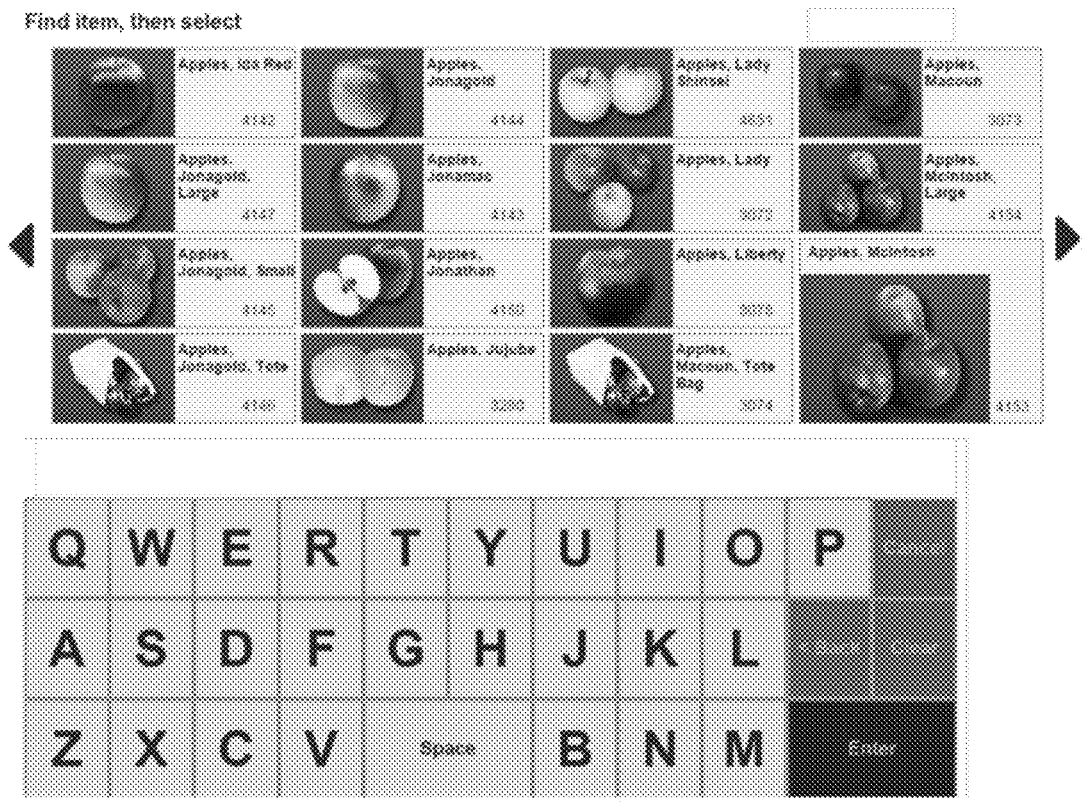
FIG. 4 is a screen display portion showing another display of multiple elements in accordance with embodiments of the present disclosure.

FIG. 4 illustrates a screen display portion showing another display of multiple elements in accordance with embodiments of the present disclosure. Referring to FIG. 4, the screen display portion may be a portion of what is displayed on the example display 110 shown in FIG. 1. The screen display portion includes 15 elements associated with 15 different types of apples that are available for purchase in an example grocery store. In this example, the element corresponding to the Mcintosh variety of apple is higher in the hierarchy than the other apple varieties, and therefore it is displayed larger in accordance with embodiments of the present disclosure. The screen display portion of FIG. 4 also depicts a keyboard with which a user can interact by use of a mouse or touchscreen display as will be understood.

In accordance with embodiments of the present disclosure, elements can be displayed in any suitable size and format such that they are differentiated from each other based on a hierarchy as disclosed herein. In the example of FIGS. 3 and 4, the elements are presented in two (2) different sizes, although it should be understood that the elements may be presented in any number of different sizes based on a hierarchy of the elements with respect to each other (e.g., elements higher in the hierarchy may be displayed larger than lower elements). In an example, the elements may be displayed in either small, medium, or large size. In another example, sizes may be directly proportional to the likelihood of selection (but within a minimum and maximum range size).

In accordance with embodiments of the present disclosure, elements may be altered for differentiation in ways other than sizing. For example, the text may be bolded or not, different colors, different background (e.g., color), different border emphasis, the like, or combinations thereof.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs may be implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:
1. A method comprising:
  capturing, by an image capturing device, one or more images, including a machine-readable image and a photographic image of a user;

retrieving, by a processor, from memory, identification information from the user based on the captured one or more images of the user;

receiving, by the processor, display information of a plurality of elements, each element being associated with a purchase transaction;

determining, by the processor, a placement position hierarchy of one of the elements with respect to at least one of the other elements based on the retrieved identification information based on comparing a likelihood of purchase of an item for sale associated with the one of the elements against a likelihood of purchase of the at least one of the other elements;

placing, by the processor, the one of the elements higher in the placement position hierarchy when the one of the elements is more likely to be purchases than the at least one of the other elements;

determining, by the processor, a display specification for the one of the elements based on the determined placement position hierarchy;

constructing, by the processor, a graphical display representation of the placement position hierarchy based on the placement position hierarchy, the received display information, and the display specification; and displaying, by the processor, the graphical representation of the placement position hierarchy of one of the elements on the display in accordance with the determined display specification.

2. The method of claim 1, wherein the elements are each associated with data indicating a default display specification.

3. The method of claim 1, wherein the elements are each associated with an item for sale.

4. The method of claim 3, further comprising ordering the elements in the placement position hierarchy based on a sales status of the elements.

5. The method of claim 1, wherein the display specification indicates one of a size and display location of the one of the elements.

6. The method of claim 1, further comprising determining the likelihood based on one of sales and discounts of items for sale associated with the elements.

7. The method of claim 1, further comprising determining the likelihood based on data predictions of at least one of a purchaser's previous buying habits, items for purchase, and demographics.

8. The method of claim 1, further comprising determining the likelihood based on one of a season, a time of day, and day that items associated with the elements are being purchased.

9. The method of claim 1, wherein dynamically determining a display specification comprises dynamically determining the display specification during a purchase transaction.

10. The method of claim 1, further comprising:
at a checkout terminal:
initiating a purchase transaction;
receiving user input for controlling display of the elements, the elements each being associated with an item for purchase;
receiving user input for selecting one or more of the elements; and
conducting the purchase transaction based on the selection of the one or more of the elements.

11. The method of claim 1, wherein the identification information of the user comprises purchase history information for the user, wherein purchase history information further comprises any one of one or more items previously purchases by the user and one or more items frequently purchased by the user.

12. A system comprising:
a display;
an image capturing device configured to capture one or more images, including a machine-readable image and a photographic image of a user; and
a purchase transaction manager comprising at least one processor and memory configured to:
retrieve, by the processor from the memory, identification information of the user based on the captured one or more images of the user;
receive, by the processor, display information of a plurality of elements, each element being associated with a purchase transaction;
determine, by the processor, a placement position hierarchy of one of the elements with respect to at least one of the other elements based on the retrieved identification information based on comparing a likelihood of purchase of an item for sale associated with the one of the elements against a likelihood of purchase of the at least one of the other elements;
place the one of the elements higher in the placement position hierarchy when the one of the elements is more likely to be purchases than the at least one of the other elements;
determine, by the processor, a display specification for the one of the elements based on the determined placement position hierarchy;
construct a graphical display representation of the placement position hierarchy based on the placement position hierarchy, the received display information, and the display specification; and
display, by the processor, the graphical display representation of the placement position hierarchy of one of the elements on the display in accordance with the determined display specification.

13. The system of claim 12, wherein the elements are each associated with data indicating a default display specification.

14. The system of claim 12, wherein the elements are each associated with an item for sale.

15. The system of claim 14, wherein the purchase transaction manager is configured to order the elements in the placement position hierarchy based on a sales status of the elements.

16. The system of claim 12, wherein the display specification indicates one of a size and display location of the one of the elements.

17. The method of claim 12, wherein the identification information of the user comprises purchase history information for the user, wherein purchase history information further comprises any one of one or more items previously purchases by the user and one or more items frequently purchased by the user.

* * * * *